(12) United States Patent
Sun

(10) Patent No.: US 8,326,594 B2
(45) Date of Patent: Dec. 4, 2012

(54) POWER FLOW ANALYSIS FOR BALANCED POWER DISTRIBUTION SYSTEMS

(75) Inventor: Hongbo Sun, Plymouth, MN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 140 days.

(21) Appl. No.: 12/964,849

(22) Filed: Dec. 10, 2010

(65) Prior Publication Data

US 2012/0150497 A1      Jun. 14, 2012

(51) Int. Cl.
    *G06G 7/54*        (2006.01)
(52) U.S. Cl. .................. 703/18; 703/1; 703/2; 702/182; 702/134
(58) Field of Classification Search .................. 703/1, 2, 703/18; 702/182, 134
    See application file for complete search history.

(56) References Cited

PUBLICATIONS

Vaithianathan Venkatasubramanian, Heinz Schattler Dynamics of Large Constrained Nonlinear Systems—A Taxonomy Theory Proceedins of the IEEE, vol. 83, No. 11, Nov. 1995.*

* cited by examiner

*Primary Examiner* — Kamini S Shah
*Assistant Examiner* — Cuong Luu
(74) *Attorney, Agent, or Firm* — Dirk Brinkman; Gene Vinokur

(57) ABSTRACT

A method analyzes a model of a balanced power distribution system by transforming a model of the balanced distribution system with zero impedance branches to an equivalent model of the balanced power distribution system with non-zero impedance branches. Decoupled power mismatch equations with second orders are generated for each bus in the equivalent model. Power mismatches are determined using the bus power flow equations. The power mismatches are compared to a predetermined threshold. Then, for each bus, solving iteratively, if the comparing is true, the power mismatch equations to obtain a bus voltage magnitude correction and a bus phase angle correction until the comparing is false.

8 Claims, 3 Drawing Sheets

100

200

POWER FLOW ANALYSIS FOR BALANCED POWER DISTRIBUTION SYSTEMS

FIELD OF THE INVENTION

This invention relates generally to power distribution systems, and more particularly to power flow analysis for balanced power distribution systems.

BACKGROUND OF THE INVENTION

In power distribution engineering, power flow analysis is commonly used to obtain the voltage magnitude and the phase angle for each bus in a distribution system, for specified source and load conditions. After the voltages and phase angles are known, currents and powers in each branch, as well as the output of the sources, can be determined analytically. Due to the nonlinear nature of the problem, numerical methods are frequently used to obtain an acceptable solution.

As a special case of power distribution systems, the loads and impedances of a balanced distribution system are three phase balanced, and therefore its steady state performances are usually analyzed by using single-phase power flow analysis with positive sequence parameters.

Depending on known parameters, distribution system buses can be classified as three types:
1. in a swing bus, the voltage magnitude V and the phase angle $\theta$ are known;
2. in a PQ bus, the active power P and the reactive power Q are known; and
3. in a PV bus, the active power P and voltage magnitude V are known.

The bus type is determined by the known parameters of connected sources and loads.

Various methods for solving the power flow problem are known. Those methods differ in either the form of the equation describing the system, or the numerical techniques used. A bus admittance matrix based method is widely used. Typical methods include the Gauss-Seidel method, the Newton-Raphson method, and the Fast Decoupled method. Those methods formulate the power flow problems as linear systems and solved the problem by either direct or iterative techniques.

SUMMARY OF THE INVENTION

The embodiments of the invention provide a method for analyzing a model of a balanced power distribution system with explicitly defined zero impedance branches. The method models such branches accurately, and avoids the occurrences of solution divergence that are usually caused by zero or small impedance branches in conventional methods.

A set of decoupled power mismatch equations are generated in polar coordinates, for each bus. The generation uses a Taylor series expansion up to second orders to replace trigonometric functions. The second order terms are used in active power mismatch equations to improve convergence. The full branch impedances are included in both the active and reactive power mismatch equations without any simplifications. Such models enable the seamless integration of the distribution sources and distribution loads into the solution process.

A hybrid direct and indirect procedure is used to solve the active and reactive power mismatch equations, respectively. A direct procedure based on sparse Lower and Upper triangular decomposition with partial Pivoting (LUP), is used in the active power mismatch solution. A iterative procedure based on restarted generalized minimal residual (GMRES) with incomplete Lower and Upper triangular Preconditioner (ILU) is used for the reactive power mismatch solution.

DETAILED DESCRIPTION OF THE PREFERRED EMBODIMENTS

Figure 1:
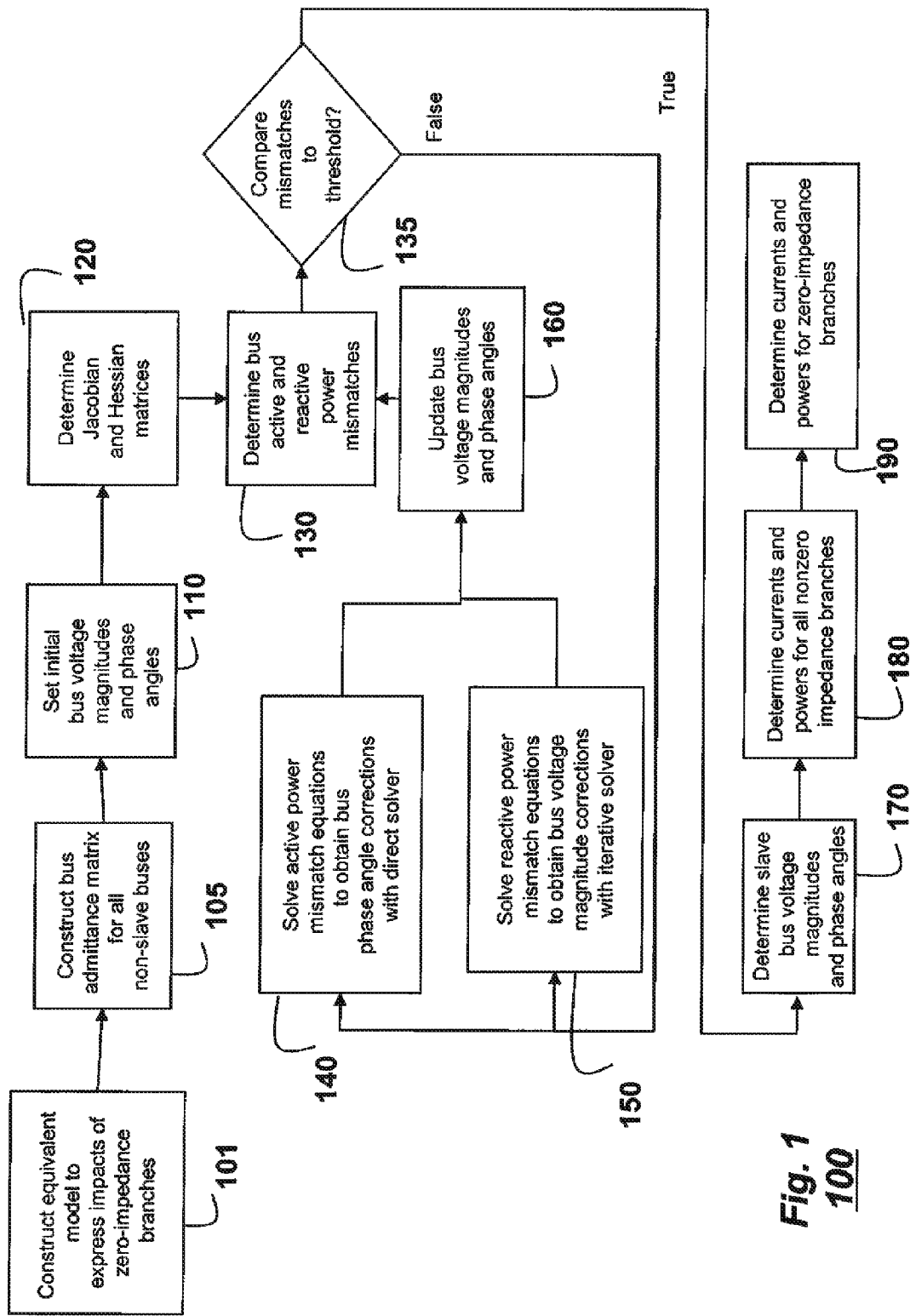
FIG. 1 is a flow diagram of a method for analyzing a model of a balanced power distribution system according to embodiments of the invention.

FIG. 1 shows a method 100 for analyzing a model of a balanced power distribution system according to embodiments of the invention.

Figure 3:
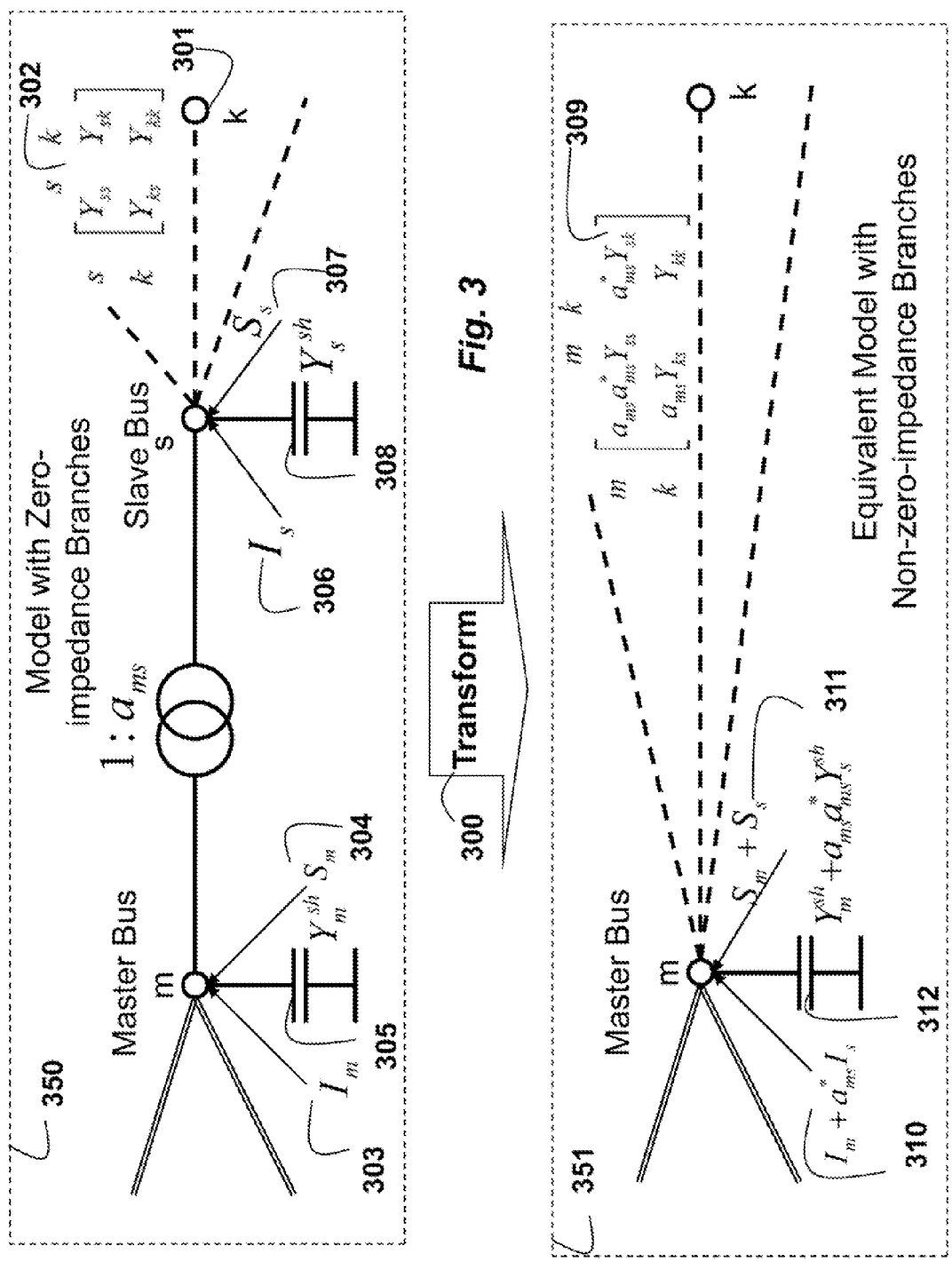
FIG. 3 is a schematic of transforming a model of a balanced distribution system with zero impedance branches to an equivalent model of a balanced power distribution system with non-zero impedances according to embodiments of the invention.

In step 101, a model of an equivalent non-zero impedance system 351 is constructed to fully replicate the impact of zero impedance branches in a conventional model 350, see FIG. 3. This is done by transforming 300 the model of the distribution system 350 with zero impedance branches to the equivalent model of distribution system 351 with non-zero impedances. Shunt compensations, injected currents and powers at slave buses of zero impedance branches are integrated into the master buses, and related voltage and current transformations between the master and slave buses defined by the zero-impedance branches are combined with adjacent branch impedances to include in the equivalent branches of the model 351, see FIG. 3.

In step 105, bus admittance matrix is constructed by using branch admittance matrix of each branch in the distribution system 351, and all buses in the distribution system 350 are included except the slave buses of zero-impedance branches. All shunt compensations and constant impedance loads are added to the self-admittances of the corresponding buses to be modeled.

In step 110, the initial voltage magnitude and phase angle for each bus is set, if unknown. The initial voltage magnitude is set by multiplying the swing bus voltage magnitude with the voltage increasing ratio introduced by the transformers along a shortest path from the swing bus to the bus. The initial phase angle is set by the swing bus phase angle and the phase angle changes added through the phase shifters along the shortest path from the swing bus to the bus.

In step 120, Jacobian and Hessian matrices for the active power are determined over bus phase angles. The Jacobian matrix of the reactive power is determined over bus voltage magnitudes. Both the Jacobian and Hessian matrices are determined with initial voltage magnitudes and phase angles, which remain constant. Full impedances are included without any simplifications, and trigonometric functions are replaced with corresponding Taylor series expansions, up to a second order.

Step 130 determines bus active and reactive power mismatches. The power mismatches are determined using bus power flow equations, and current bus voltage magnitudes and phase angles. The injected power of constant current loads are treated as known, and updated when the voltage magnitudes and phase angles are updated.

Step 135 determines if the power mismatches are less than a predetermined threshold, or not. If true, or a predetermined number of iterations is reached, go to step 170, otherwise, if false, perform steps 140 and 150. Steps 140 and 150 can be performed in parallel.

Step 140 iteratively solves the active power mismatch equation based on the Jacobian and Hessian matrices of the active power as a function of phase angle with a direct procedure. The active power mismatch caused by the second order terms are treated as known values, and are determined using the voltage magnitude and phase angle obtained at the previous iteration. The linear equation is solved by a sparse Lower and Upper triangular decomposition with partial Pivoting (LUP). The solution is the correction for the bus phase angles.

Step 150 iteratively solves the reactive power mismatch equation based on the Jacobian matrix of the reactive powers over voltage magnitudes as a linear equation that is solved by a preconditioned restarted generalized minimal residual (GMRES) method preconditioned using the diagonals of the Jacobian matrix. The solution is the correction for the bus voltage magnitudes.

Step 160 updates the bus voltage magnitude and phase angle with the changes obtained in step 140 and 150.

Figure 2:
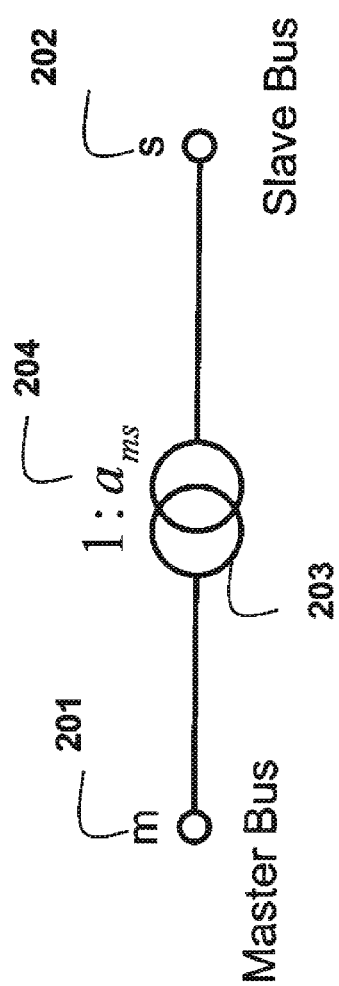
FIG. 2 is a schematic of generalized zero-impedance branch model used for modeling zero-impedance devices.

Step 170 determines the voltage magnitudes and phase angles of the slave buses by multiplying the corresponding master bus complex voltages with the equivalent transformer ratios of the zero impedance branch models 204, see FIG. 2.

Step 180 determines currents for all non-zero impedance branches of the distribution system 350 based on the bus voltage magnitudes and phase angles, and branch impedances, and then the active and reactive powers flowing through the branches are determined accordingly.

Step 190 determines the currents entering the slave buses through the zero-impedance branches of the distribution system 350 based on a bus complex current balance equation at the slave buses, and the powers based on a bus complex power balance equation. The current leaving the master bus through the zero-impedance branch is determined by multiplying the complex current entering the slave bus through the branch with the conjugate of the equivalent transformer ratio of the branch model 204. The power leaving the master bus through the branch is the same as the power entering the slave bus through the branch.

The steps of the above method can be performed in a processor connected to a memory and input/output interfaces as known in the art.

Modeling of Zero-Impedance Branches

Many branches in a power distribution system have a very low impedance, such as voltage regulators, switches, ideal transformers, ideal phase shifters, elbows, and jumpers. In practice, these low impedances are ignored and set to zero in the conventional model. The consequence is that some entries are infinite in the resultant bus admittance matrix, and thus the admittance matrix based approaches are inapplicable. In order to use the bus admittance matrix based approaches, the conventional methods have arbitrarily assigned small non-zero impedances to those branches. However, assigning the small impedances makes the analysis ill-conditioned, and power flows are difficult to converge. The embodiments of the invention use a different approach to handle the zero-impedance branches in power flow analysis.

FIG. 2 shows a generalized model 200 for representing zero-impedance branches in a power distribution system. A branch has a master bus m 201 and a slave bus s 202. The buses are connected by an ideal transformer 203. The transformer has a ratio $1:a_{ms}$, where $a_{ms}$ 204 is a complex number. The slave bus is not connected to any other zero impedance branches. If both buses are not connected to any zero impedance branches, the "down stream" bus, with respect to the current flow, is the slave bus.

The complex transformer ratio becomes 1, when the branch is a switch, or small conductors, a real number when it is an ideal voltage regulator or transformer, and a complex number with magnitude 1.0 when it is an ideal phase shifter.

The current flowing to the slave bus through the branch is equal to the current flowing from the master bus divided with the conjugate of the complex ratio. The voltage at the slave bus is equal to the voltage at the master bus multiplied by the complex ratio.

When constructing the bus admittance matrix, only the non-slave buses are considered. The zero-impedance branches are not used. The impacts of the zero impedance branches are represented through the associated master buses and the branches adjacent to the slave buses as shown in FIG. 3.

FIG. 3 shows an example construction of an equivalent distribution system model 351 with non-zero impedances as performed by step 101 of FIG. 1. The construction transforms 300 a model 350 of a distribution system with zero impedance branches to the equivalent distribution system model 351 with non-zero impedances.

In the system model 350, a zero-impedance branch is connected to three branches (broken lines) by the slave bus, and to two branches (double lines) by the master bus. Taking one adjacent branch between slave bus s and bus k 301 as example, the branch admittance matrix is $$\begin{array}{c} & s & k \\ s & \begin{bmatrix} Y_{ss} & Y_{sk} \\ Y_{ks} & Y_{kk} \end{bmatrix} & 302, \end{array}$$

where $Y_{ss}$ and $Y_{kk}$ are the self admittances of the branch at the slave bus s and the bus k, and $Y_{sk}$ and $Y_{ks}$ are the mutual admittances of the branch between the bus s to bus k, and bus k to bus s, respectively. The master bus m provides an injected complex current $I_m$ 303, an injected complex power $S_m$ 304, and a shunt compensator with admittance $Y_m^{sh}$ 305. The slave bus s provides an injected complex current $I_s$ 306, an injected complex power $S_s$ 307 and a shunt compensator with admittance $Y_s^{sh}$ 308.

In the model 351, the zero-impedance branch and the slave bus s are removed. There are no changes for the branches connected to the master bus m. The branches connected to the slave bus s are reconnected to bus m, and the branch admittance matrices are modified accordingly.

The branch between bus s and k in the system 350 is replaced with a new branch between bus m and bus k in the system 351, and the branch admittance matrix is $$\begin{array}{c} & m & k \\ m & \begin{bmatrix} a_{ms}a_{ms}^*Y_{ss} & a_{ms}^*Y_{sk} \\ a_{ms}Y_{ks} & Y_{kk} \end{bmatrix} & 309. \end{array}$$

The self admittance at bus m is determined from the product of self admittance at bus s in the model 350 and the square of the zero-impedance branch ratio. The mutual admittance for bus m to k is the product of the conjugate of the zero-impedance branch ratio and mutual admittance for bus s to k in the system 350. The mutual admittance for bus k to bus m is the product of the zero-impedance branch ratio and mutual admittance for bus k to bus s in the model 350.

The current at the salve bus s is multiplied with the conjugate of zero-impedance branch ratio, $a_{ms}^*$ to add to the master bus m, and the equivalent current at bus m is $(I_m + a_{ms}^* I_s)$ 310, where * signifies the complex conjugate. The power at bus s are directly added to bus m, and the resulting equivalent complex power at bus m is $(S_m + S_s)$ 311. The shunt compensation admittance at bus s is multiplied with the square of the zero-impedance branch ratio, $a_{ms}a_{ms}^*$ to add to bus m, and the equivalent shunt compensation admittance at bus m is $(Y_m^{sh} + a_{ms}a_{ms}^* Y_s^{sh})$ 312.

If there are multiple zero-impedance branches connected to bus m, each branch maps its shunt compensation, and adds currents and powers from the slave bus to the master bus, accordingly.

Modeling of Distribution Sources and Loads

The generation source for the power distribution system is usually a power transmission system, and corresponding equivalent source models are expressed as a swing bus, or a PV bus in the power flow analysis.

In addition to the equivalent sources, the power distribution system can also have distributed power generators. Depending on the types of energy sources and energy converters, the distribution power generators are specified by a constant power factor model, constant voltage model, or variable reactive power model.

The buses connected to the constant power factor generators or the variable reactive power generators are treated as PQ buses. For the constant power factor generator, the specified values are the active power output and power factor. The reactive power output is determined from the active power and the power factor. For the variable reactive power generator, the active power output is specified, and the reactive power output is determined by applying a predetermined polynomial function to the active power output.

The buses connected to constant voltage generators are treated as PV buses, and the specified values are the outputs of the active powers and the magnitudes of bus voltages. These buses are also selected as master buses when the equivalent system model 351 is constructed.

The distribution load models include a constant impedance load, a constant power load, and a constant current load. The constant impedance load is directly treated as a connected bus shunt impedance, which is embedded into the bus admittance matrix.

The constant power load is modeled as bus injected power. The constant current load is converted to equivalent bus injected powers to be modeled. The equivalent injected powers are based on estimated bus voltages. The powers are recalculated when the current bus voltages become available during the iterations of the solution.

By converting to PV or PQ buses or shunt compensations, the distribution source and load models are seamlessly integrated into the solution process.

Decoupled Power Flow Equations with Full Impedances and Second Order Terms

The power flow equations for all non-slave buses are $$P_i = V_i \sum_j V_j [G_{ij}\cos(\theta_i - \theta_j) + B_{ij}\sin(\theta_i - \theta_j)], \text{ and} \quad (1)$$

$$Q_i = V_i \sum_j V_j [G_{ij}\sin(\theta_i - \theta_j) - B_{ij}\cos(\theta_i - \theta_j)] \quad (2)$$

where, $P_i$ and $Q_i$ are the net injected active power and reactive power at bus i, $V_i$ and $\theta_i$ are the voltage magnitude and phase angle at bus i, and $G_{ij}$ and $B_{ij}$ are the real and imaginary part of the bus admittance matrix element associated with bus i and bus j.

Similar as the Fast Decoupled method, the active power is expressed as a function of bus phase angles, and the reactive power is a function of bus voltage magnitudes. By applying the Taylor expansion to Eqns. (1) and (2), and retaining up to second order terms, one obtains $$\frac{\Delta P}{V} = J_\theta \Delta\theta + \frac{1}{2}\Delta\theta^T H_\theta \Delta\theta, \text{ and} \quad (3)$$

$$\frac{\Delta Q}{V} = J_V \Delta V \quad (4)$$

where $\Delta P$ and $\Delta Q$ are vectors of bus power changes, $\Delta\theta$ and $\Delta V$ are the vectors of bus phase angle and voltage magnitude changes, $J_\theta$ and $H_\theta$ are the Jacobian and Hessian matrices of bus active powers with respect to bus phase angles, and $J_V$ is the Jacobian matrix of bus reactive powers with respect to bus voltage magnitudes.

The element of Jacobian $J_\theta$ that is associated with the active power at bus i and phase angle at bus j, $J_{\theta_{ij}}$ is $$\frac{1}{V_i}\frac{\partial P_i}{\partial \theta_j}.$$

The element of Hessian $H_\theta$ that is associated the active power at bus i with the phase angles at bus j, and bus k is $$\frac{1}{V_i}\frac{\partial^2 P_i}{\partial \theta_j \partial \theta_k}$$

Similarly, the element of Jacobian $J_V$ that is associated the reactive power at bus i with the voltage magnitude at bus j is $$\frac{1}{V_i}\frac{\partial Q_i}{\partial V_j}.$$

During the formulation of the Jacobian and Hessian matrices, the function sine(x) and cosine(x) are replaced with the Taylor series up to 2-orders respectively, that is x and $$1 - \frac{x^2}{2},$$

to simplify the formulation and speed up the calculation.

Hybrid Direct and Indirect Procedures

The power flow equations were usually solved either by a direct solution technique or an iterative solution technique. Considering the characteristic difference between the active power and reactive power problems, the embodiments of the invention use a hybrid procedure to solve the power flows described in Eqns. (3) and (4), in which the direct solution technique is used to solve the active power mismatch equations, and the iterative procedure to solve the reactive power mismatch equations.

For the active power mismatch problem, the following equation is used:

$$J_\theta(V^{(0)}, \theta^{(0)})\Delta\theta = \frac{\Delta P^{(k)}}{V^{(k)}} - \frac{1}{2}\Delta\theta^{(k)T} H_\theta(V^{(0)}, \theta^{(0)})\Delta\theta^{(k)} \quad (5)$$

The Jacobian matrix $J_\theta(V^{(0)},\theta^{(0)})$ and the Hessian matrix $H_\theta(V^{(0)},\theta^{(0)})$ are determined by using the initial bus voltage magnitude $V^{(0)}$ and phase angle $\theta^{(0)}$, which remain constant during the iterations. The first item in the right hand side is the bus active power mismatch divided by the corresponding bus voltage magnitude that was determined with bus voltage magnitude and phase angle obtained during the previous iteration k. The second item is the additional mismatch added by the second order of phase angle changes also determined by using the phase angles obtained at previous iteration. This linear equation is solved by a sparse Lower and Upper triangular decomposition with partial Pivoting. The bus phage angle vector θ is updated when the phase angle correction vector Δθ is solved.

For the reactive power mismatch problem, the following equation is used $$J_V(V^{(0)}, \theta^{(0)})\Delta V = \frac{\Delta Q^{(k)}}{V^{(k)}} \quad (6)$$

The Jacobian matrix $J_V(V^{(0)},\theta^{(0)})$ is determined with initial bus voltage magnitudes and phase angles, which remain constant during the iterations. The right hand side is the bus reactive power mismatch divided by corresponding bus voltage magnitude that was determined with bus voltage magnitude and phase angle obtained during the previous iteration k. This linear equation is solved by using the restarted Generalized Minimal Residual method with incomplete LU pre-conditioner. The diagonal elements of the Jacobian matrix are taken as the preconditioned matrix. The bus voltage magnitude vector V is updated when the voltage magnitude correction vector ΔV is solved.

The ideal values are used to set the initial values for bus voltage magnitudes and phase angles. It is assumed that the impedances of all branches are zero. The initial voltage magnitude of a bus is set as the result of multiplying the swing bus voltage magnitude by all voltage increasing ratios resulting from the transformers along the shortest path from the swing bus to the study bus. The bus initial phase angle is set as the swing bus phase angle plus all phase angle changes resulting from the phase shifters along the shortest path from the swing bus to the bus.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for analyzing a model of a balanced power distribution system, comprising the steps of:
    transforming a model of the balanced power distribution system with zero impedance branches to an equivalent model of the balanced power distribution system with non-zero impedance branches, wherein:
    shunt impedances, injected currents and powers at slave buses of zero impedance branches are integrated into master buses, and related voltage and current transformation implicitly expressed in the zero-impedance branches are combined with adjacent branch impedances in the equivalent model,
    an equivalent bus admittance matrix for each bus in the equivalent model, except the slave buses of zero-impedance branches is constructed, and
    shunt compensations and constant impedance loads are added to the self-admittance elements of the corresponding buses to be modeled;
    generating decoupled power mismatch equations for each bus in the equivalent model;
    determining power mismatches using the power mismatch equations;
    comparing the power mismatches to a predetermined threshold; and
    solving iteratively for each bus and if the comparing is true, the power mismatch equations to obtain a bus voltage magnitude correction and a bus phase angle correction until the comparing is false, or a predetermined number of iterations is reached, wherein the steps are performed in a processor.

2. The method of claim 1, wherein the power mismatch equations are in polar coordinates and include an active power mismatch equation and a reactive power mismatch equation.

3. The method of claim 2, wherein the active power mismatch equation is solved with a sparse Lower and Upper triangular decomposition with partial Pivoting (LUP) to obtain the bus phase angle correction, and the reactive power mismatch equation is solved with a restarted generalized minimal residual (GMRES) method with Incomplete LU pre-conditioner (ILU) to obtain the bus voltage magnitude correction.

4. The method of claim 1, further comprising setting an initial voltage magnitude and phase angle for each bus, if unknown.

5. The method of claim 1 further comprising:
    determining a Jacobian matrix and a Hessian matrix for active power over phase angles with initial bus voltage magnitudes and phase angles; and
    determining a Jacobian matrix for reactive power over bus voltage magnitudes with initial bus voltage magnitudes and phase angles.

6. The method of claim 5, further comprising:
    replacing trigonometric functions with corresponding Taylor series expansions, up to a second order; and
    computing the Jacobian and Hessian matrices with full branch impedances without any simplifications.

7. The method of claim 1, further comprising:
    determining a voltage magnitude and a phase angle of the slave bus by multiplying a corresponding master bus complex voltage with a transformer ratio of the zero-impedance branch model.

8. The method of claim 1, further comprising:
    determining currents for all non-zero impedance branches based on current bus voltage magnitudes and current phase angles, and branch impedances; and
    determining currents entering the slave buses through the zero-impedance branches based on a bus complex current balance theorem, and power based on a bus complex power balance theorem.

* * * * *